US007882187B2

(12) United States Patent
Gammage et al.

(10) Patent No.: US 7,882,187 B2
(45) Date of Patent: Feb. 1, 2011

(54) METHOD AND SYSTEM FOR DETECTING UNDESIRED EMAIL CONTAINING IMAGE-BASED MESSAGES

(75) Inventors: Simon David Hedley Gammage, Mississauga (CA); Robert Anthony Osborne, Toronto (CA); Bruce Murray Walker, Mississauga (CA)

(73) Assignee: Watchguard Technologies, Inc., Seattle, WA (US)

( * ) Notice: Subject to any disclaimer, the term of this patent is extended or adjusted under 35 U.S.C. 154(b) by 417 days.

(21) Appl. No.: 11/548,719

(22) Filed: Oct. 12, 2006

(65) Prior Publication Data

US 2008/0091765 A1 Apr. 17, 2008

(51) Int. Cl.
*G06F 15/16* (2006.01)

(52) U.S. Cl. .................. 709/206; 709/224; 455/445; 455/525

(58) Field of Classification Search ............... 709/202, 709/206
See application file for complete search history.

(56) References Cited

U.S. PATENT DOCUMENTS

| | | | | |
|---|---|---|---|---|
| 5,889,578 | A * | 3/1999 | Jamzadeh ............ | 355/41 |
| 6,574,378 | B1 * | 6/2003 | Lim .................. | 382/305 |
| 6,704,024 | B2 * | 3/2004 | Robotham et al. ...... | 345/581 |
| 6,937,363 | B1 * | 8/2005 | Yamaguchi ........... | 358/1.9 |
| 2003/0100308 | A1 * | 5/2003 | Rusch ................ | 455/445 |
| 2004/0210640 | A1 | 10/2004 | Chadwick et al. | |
| 2005/0022008 | A1 * | 1/2005 | Goodman et al. ...... | 713/201 |
| 2005/0090277 | A1 * | 4/2005 | Islam et al. .......... | 455/525 |
| 2005/0216564 | A1 | 9/2005 | Myers et al. | |
| 2005/0262209 | A1 * | 11/2005 | Yu ................... | 709/206 |
| 2006/0036728 | A1 * | 2/2006 | Xie .................. | 709/224 |
| 2006/0149820 | A1 | 7/2006 | Rajan et al. | |
| 2007/0111721 | A1 * | 5/2007 | Schmidt et al. ........ | 455/419 |

FOREIGN PATENT DOCUMENTS

WO    WO 2005/094238 A2    10/2005

(Continued)

OTHER PUBLICATIONS

Aradhye, H.B., et al., "Image Analysis for Efficient Categorization of Image-based Spam E-mail," Proceedings of the 2005 Eight International Conference on Document Analysis and Recognition (ICDAR'05), 2005, 5 pages, IEEE.

(Continued)

*Primary Examiner*—Wing F Chan
*Assistant Examiner*—Tesfay Yohannes
(74) *Attorney, Agent, or Firm*—Kory D. Christensen; Stoel Rives LLP

(57) ABSTRACT

A system and method of detecting undesired email containing image-based messages employs a statistical analysis process which identifies and assigns probability values to the presence of each of a pre-selected set of text-related characteristics of an email under consideration and to the presence of each of a pre-selected set of image-related characteristics of the email under consideration. The identified characteristics and their associated probability values are used to determine whether the email is undesired. In one embodiment, the identification and assignment of probability values is a Bayesian analysis and, preferably, a Statistical Token Analysis. The system and method can identify undesired emails which contain images having messages, generally in the form of text in the image.

15 Claims, 2 Drawing Sheets

FOREIGN PATENT DOCUMENTS

WO WO 2006/119508 A2 11/2006

OTHER PUBLICATIONS

Graham, P., "A Plan for Spam," Aug. 2002, www.paulgraham.com/hp.html, pp. 1-14, Hackers & Painters.

Leavitt, N., "Vendors Fight Spam's Sudden Rise," Technology News, Mar. 2007, pp. 16-19, IEEE Computer Society.

Nhung, N.P., et al., "An Efficient Method for Filtering Image-Based Spam E-mail," Posts and Telecommunications Institute of Technology, Vietnam, 2007, pp. 96-102, IEEE.

* cited by examiner

METHOD AND SYSTEM FOR DETECTING UNDESIRED EMAIL CONTAINING IMAGE-BASED MESSAGES

FIELD OF THE INVENTION

The present invention relates to a system and method for detecting undesired email. More specifically, the present invention relates to a system and method for detecting undesired email wherein the email contains image-based messages.

BACKGROUND OF THE INVENTION

Unsolicited and/or undesired email is a significant problem for email administrators and users. A common category of undesired email is SPAM which is generally defined as bulk unsolicited email, typically for commercial purposes. Other categories of undesired email can be bulk email containing viruses and/or malware and the like or "phishing" messages which attempt to fool recipients into visiting misleading websites and/or revealing private information about the user.

At best, undesired email utilizes resources on email systems, occupies email recipient's time to review and delete the undesired emails and is generally frustrating and troublesome. At worst, undesired email can be malicious and can damage software, systems and/or stored data and/or can promote or cause identity theft and/or financial loss, etc.

Much work has been undertaken in recent years to combat the growing problem of undesired email. One of the more common methods used to date to reduce undesired email is the use of filters, such as Bayesian-based filters, to remove, flag or otherwise identify possible undesired email. With many filter systems, the content of received emails is examined for specified text, or patterns of text, to form a statistical decision as to whether the email is likely an undesired email.

However, as each new technical solution to detecting undesired email is introduced and deployed, the originators of undesired email alter their messages and/or sending techniques in attempts to circumvent the undesired email detection systems.

In particular, as the originators of undesired email identify the characteristics used by filter-based systems, such as Bayesian filters, to identify undesired email, the originators alter the content of their undesired emails in attempts to convince the filters that their emails are not undesired. For example, originators of undesired emails intentionally misspell keywords in the text of the email and/or insert additional sentences of innocuous words or phrases to defeat statistical analysis filters.

As the implementers of the filters are exposed to more and more examples of undesired emails which employ a variety of attempts at circumventing the filters, the filters are updated and retrained to become more robust and effective.

As the originators of undesired emails are limited in the techniques they can employ in their undesired messages because their messages must ultimately be readable and/or otherwise acceptable to the recipients of the messages, it has become increasingly difficult for the originators to succeed in getting their emails through the filters.

Most recently, originators of undesired emails have begun employing image-based messages in their undesired emails. In such image-based messages, an image, or picture, of the message text is sent in the undesired email rather than sending the text as a conventional character representation. For example, the undesired email may contain an image containing an image of a sexual nature with a URL for an associated pornographic web site also shown in the image. As most filter systems rely on an analysis of the text contents of undesired emails, along with header and other envelope information, to identify an undesired email, replacing the message text with an image, such as a PNG, GIF or JPG file, containing the text can deny the filter the necessary information to make a decision about the email while still permitting the recipient to read the message. In the above-mentioned example, conventional filter systems may fail to identify the pornographic web site email as the URL is not a text representation that will be available to the filter.

In an attempt to detect undesired email with image-based messages, some vendors of anti-spam software and systems have now added image hashing functions. These functions produce a hash value for an image in a suspected email and compare that hash value to hash values for previously processed images, allowing the system to recognize an image which has been previously identified as undesired. Unfortunately, most hash based systems are relatively easy to fool as originators of undesired messages need only randomly modify some number of image pixels so that the resulting image will no longer match a previously determined hash value.

In a more sophisticated attempt to detect undesired email with image-based messages, some vendors have added optical character recognition (OCR) functions. In these systems, the OCR functions are used to extract message text from the image in the email and then the message text is analyzed by a conventional filter system.

While such systems employing OCR functions can assist in identifying undesired email employing image-based messages, they do suffer from serious disadvantages. In particular, OCR functions are computationally expensive to operate and the cost of hardware systems to implement OCR enhanced anti-spam services is significantly higher than non-OCR systems. Further, a variety of obfuscation techniques which can inhibit or prevent OCR systems from recognizing text are well known and can be easily employed by originators of undesired emails to defeat OCR enhanced anti-spam systems. An example of a known obfuscation technique is the use of CAPTCHA s, such as that described in U.S. Pat. No. 6,195,698. to Lillibridge et al.

It is desired to have a system and method for making a statistical analysis of an email, in which at least a part of the message is image-based, to determine if the email is undesired.

SUMMARY OF THE INVENTION

It is an object of the present invention to provide a novel system and method of determining whether a received image-based email is undesired, which method and system obviate or mitigate at least one disadvantage of the prior art.

According to a first aspect of the present invention, there is provided a method for detecting undesired email containing image-based messages, the method comprising the steps of: (i) issuing an appropriate token and token value for each of a pre-selected set of text-related characteristics of an email under consideration; (ii) determining if the email under consideration contains an image and, if it does, issuing an appropriate token and token value for each of a pre-selected set of image-related characteristics of the email under consideration; (iii) performing a statistical analysis of the tokens issued for the email under consideration and determining a probability that the email is undesired; and (iv) employing the determined probability to decide whether the email is undesired.

Preferably, step (ii) further comprises the step of, if the email under consideration includes an image, issuing an appropriate token and token value for each of a pre-selected set of email structure characteristics of the email under consideration.

According to another aspect of the present invention, there is provided a method for detecting undesired email containing image-based messages, the method comprising the steps of: (i) determining the presence of each of a pre-selected set of text-related characteristics of an email under consideration and assigning a probability value to each determined characteristic; (ii) determining if the email under consideration contains an image and, if it does, determining the presence of each of a pre-selected set of image-related characteristics of the email under consideration and assigning a probability value to each determined characteristic; (iii) performing a statistical analysis of the email under consideration using the determined characteristics and their associated probability values to determine a probability that the email is undesired; and (iv) employing the determined probability to decide whether the email is undesired.

Preferably, a Bayesian probability analysis is employed in step (iii) and, more preferably, the Bayesian probability analysis is a Statistical Token Analysis and the determining of the presence of characteristics and assigning of probability values thereto comprises the issuance of appropriate tokens with corresponding values.

According to yet another aspect of the present invention, there is provided a system for detecting undesired email containing image-based messages, the system comprising: at least one incoming email server operable to receive emails; an email security device connected to a network, the email security device being operable to analyze emails received over the network and to forward received emails to said at least one incoming email server; and an undesired email detection process cooperating with the email security device and operable to: determine the presence of each of a pre-selected set of text-related characteristics of an email under consideration and assigning a probability value to each determined characteristic; determine if the email under consideration contains an image and, if it does, determining the presence of each of a pre-selected set of image-related characteristics of the email under consideration and assigning a probability value to each determined characteristic; perform a statistical analysis of the email under consideration using the determined characteristics and their associated probability values to determine a probability that the email is undesired; and wherein the email security device employs the determined probability to decide whether the email is undesired.

The present invention provides a system and method of detecting undesired email containing image-based messages. The system and method employs a statistical analysis process which identifies and assigns probability values to the presence of each of a pre-selected set of text-related characteristics of an email under consideration and to the presence of each of a pre-selected set of image-related characteristics of the email under consideration. The identified characteristics and their associated probability values are used to determine whether the email is undesired. In one embodiment, the identification and assignment of probability values is a Bayesian analysis and, preferably, a Statistical Token Analysis. The system and method can identify undesired emails which contain images having messages, generally in the form of text in the image.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

As used herein, the term "spammer" is intended to include, without limitation, the originators of undesired emails, including undesired commercial emails (typically referred to as "spam"), undesired emails including viruses or other malware, phishing messages, etc.

Figure 1:
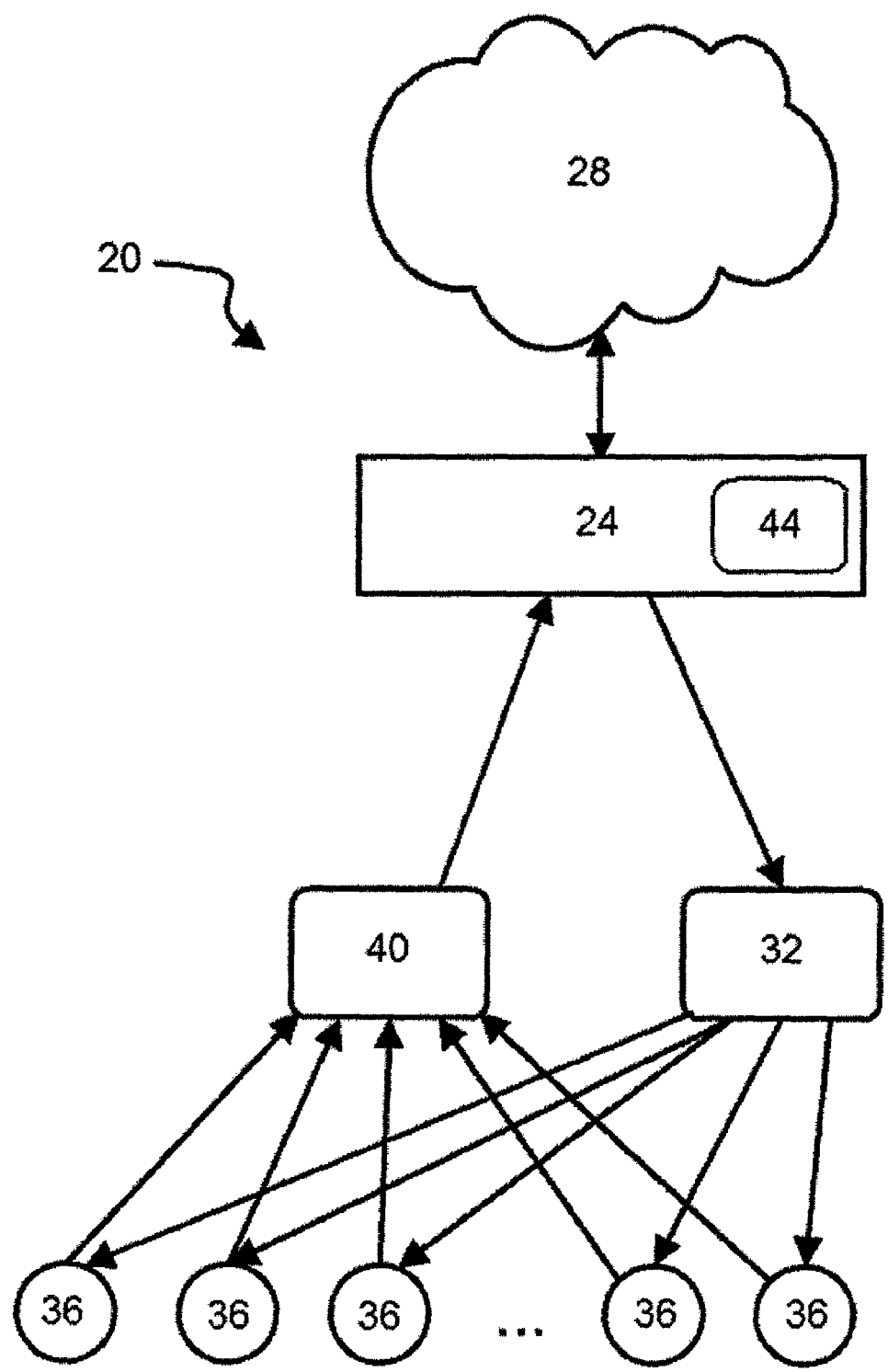
FIG. 1 shows a schematic representation of a system in accordance with the present invention.

A system for determining whether a received image-based email is undesired is indicated generally at 20 in FIG. 1. System 20 includes an email security device 24, which can be a general purpose computer or purpose built computing device, executing firewall, anti-spam and/or anti virus software. Email security device 24 is connected to one or more networks 28, such as the Internet and/or a private corporate network.

One or more incoming email servers 32 can be connected to email security device 24 to receive emails processed thereby and to provide those emails to email clients 36 which connect to incoming email servers 32 as necessary. Incoming email servers 32 can be general purpose computing devices, or purpose built computing devices, executing appropriate incoming email software such as a POP3 email application.

Similarly, one or more outgoing email servers 40 can be connected to email security device 24. Outgoing email servers 40 can be general purpose computing devices, or purpose built computing devices, executing appropriate outgoing email software such as an SMTP email application.

Outgoing email servers 40 receive emails sent from email clients 36 and forward those emails to email security device 24 which can process and forward them to incoming email servers 32 connected to email security device 24 or to network 28 for delivery to incoming email servers at other locations.

System 20 further includes an "undesired email" detection, or anti-spam, process 44. In a preferred embodiment of the present invention, process 44 comprises a statistical token analysis (STA) system, which is a form of a Bayesian filtering system. While the following discussion refers only to STA systems, the present invention is not so limited and the present invention can be employed with any appropriate statistic-based filtering system as will occur to those of skill in the art.

In the illustrated embodiment, process 44 is executed at email security device 24 but it is also contemplated that a portion of, or all of, process 44 can be executed elsewhere. For example, process 44 can operate such the portion of process 44 associated with issuing tokens for an email under consideration executes at email security device 24 while those tokens are then forwarded to a centralized service connected to email security device 24 through network 28 and this centralized service can execute the analysis and decision making portions of process 44 on these tokens. The result of the analysis and decision making process can then be forwarded back to email security device 24, through network 28, for further action.

As is well known to those of skill in the art, STA systems arrange emails into tokens, which are the smallest units for which a statistic is collected. Tokens can be words, letters, punctuation marks or any other email component and can be in the email body, header or anywhere else associated with the email.

Each token has a value assigned to it, during a training phase, which value represents likelihood that an email containing the token is an undesired email. A Bayesian statistical analysis is then performed on the tokens detected in a message, or on a subset of them, to produce a probability value that the email under consideration is an undesired email.

Unlike prior art systems, in addition to the known tokenization techniques for the text of emails, anti-spam process 44 performs a tokenization and analysis of images in emails in an attempt to recognize undesired emails with image-based messages.

Figure 2:
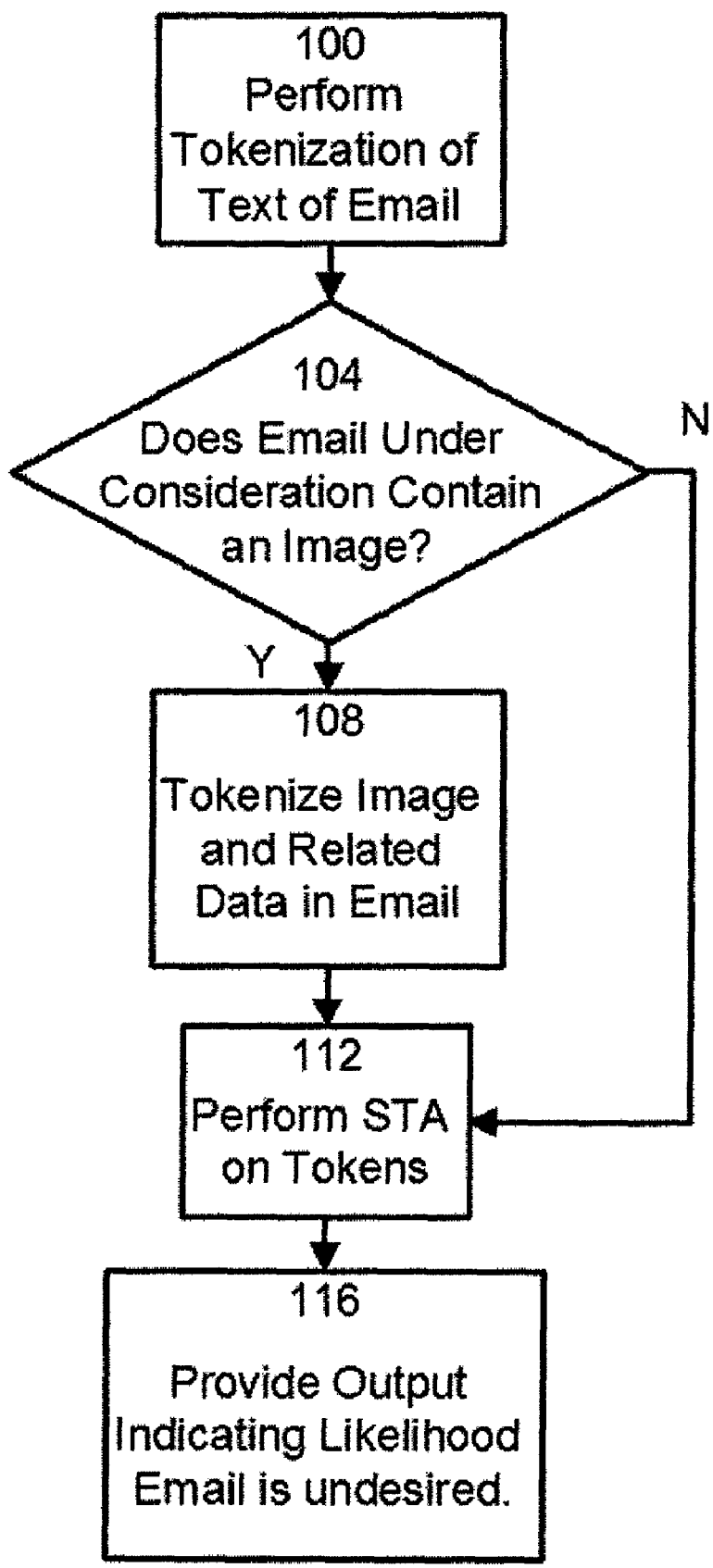
FIG. 2 shows a flowchart of a method in accordance with the present invention.

FIG. 2 shows a flowchart of a method in accordance with the present invention. The method commences at step 100 where an email under consideration has its text contents tokenized. This tokenization can be performed in a conventional manner and can include the tokenization of the text in the email body, the email header and/or any other text information associated with the email.

At step 104 a determination is made as to whether the email under consideration also includes an image. If the email does include an image, the method continues at step 108 when tokenization of the image, and related data, is performed. Otherwise, if at step 104, it is determined that the message does not contain an image, the process continues at step 112, described below.

The tokens which are issued for an image in an email under consideration are not particularly limited and can include a number of characteristics, features and parameters of the image. In fact, it is contemplated that as spammers learn of token based STA analysis of image-based messages in emails, they will alter the characteristics of their image-based messages in attempts to defeat the successful token based STA identification of their emails as being undesired and that, accordingly, the specific tokens employed, and their respective weightings, will be adjusted in turn within system 20. Various techniques for implementing this adjustment of tokens and their values are well known and will not be further described herein.

At step 112, when step 108 is complete or if at step 104 it was determined that the email does not contain an image, the STA process is performed on the tokens created for the email under consideration to make a statistical determination as to whether the email is undesired.

The method completes at step 116 when that statistical determination is output to email security device 24. Depending upon the statistical determination and the configuration of email security device 24 (which may require a user-defined level of certainty that an email is undesired), the email can then be flagged as being desired or undesired, etc.

It is contemplated that the evaluation of the text related and image related tokens can be performed by a single Statistical Token Analysis engine to produce an overall probability that the email under consideration is desired or undesired. However, it is also contemplated that it may be preferred that the text related tokens are analyzed by a first STA engine which outputs a probability that the email under consideration is desired or undesired and the image related tokens are analyzed by a second STA engine which also outputs a probability that the email under consideration is desired or undesired. Each of these probabilities can then be considered and processed in an appropriate manner by email security device 24 and used to decide whether the email under consideration is desired or undesired.

In a present embodiment of the invention, a variety of image related tokens have been created to analyze emails containing images. In particular, but by way of example only, a present embodiment of the invention employs the following tokens relating to image features, characteristics and parameters:

Invalid image tokens: a token is issued if the image in the email is not compliant with the appropriate standard for the respective image type (i.e.—GIF, JPG, PNG, etc.). It has been determined that, presently, images in many undesired emails do not conform to their respective standards, to some extent, and thus a token is issued if the image is not compliant;

Image type/name mismatch tokens: a token is issued if the file type extension (i.e.—bmp, gif, jpg, etc.) does not correspond to the actual image file type. It has been determined that, presently, images in many undesired emails do not have a correct extension, or have no extension at all. Thus a token is issued if the extension does not match or is missing;

Image dimension tokens: a token is issued for pre-selected (during training) exact image dimensions (i.e.—302×244. pixels, etc.) as well as tokens issued for the pre-selected image dimensions rounded to the nearest 10 pixels (i.e.—300×240) and/or nearest 100. pixels (i.e.—300×200). Also, an image aspect ratio (1.4:1, etc.) token is issued for pre-selected aspect ratios. The token values can vary, with higher probabilities/values being assigned to specific pre-selected exact dimensions, etc. learned during the training phase;

Image file size tokens: a token is issued for the size of the image file, as well as a token issued for the compression ratio (pixels per byte or other suitable metric) for those image formats having compressed data. Higher probabilities can be assigned to specific image files sizes and compression ratios which have been used for previous undesired emails learned during the training phase;

"Edginess" tokens: a token is issued from an appropriate edge detection or other method of identifying and quantifying text content in the image. In one embodiment, a Sobel edge detection convolution filter is passed over the image and the number of indicated edges is counted, the presumption being that undesired image-based messages will contain text and thus will have more detected edges than desired messages containing non-text images. Edginess can also be determined over subsets of the area of the image to mitigate the effect of the spammers including photographs and/or other graphics in addition to their text message to reduce the overall edginess count. Higher probabilities can be assigned to the token for images containing higher levels of edginess;

"Freckles" tokens: a token is issued from a filter which is passed over the image to detect if random pixels have been added to the image in an attempt to fool hash-based analysis of the image. As mentioned above, hash based analysis of images to recognize undesired images has been previously attempted, but is easily defeated by spammers who add randomly placed pixels to their images to fool the hash function. The "Freckles" filter looks for such intentional alterations in an image. Higher probabilities can be assigned to tokens for images with high levels of freckles;

"Connected Components" tokens: a token is issued indicating the number of distinct connected components (i.e.

connected regions with the same color or with colors which would likely be perceived by viewers as being the same) in the image. Text in an image results in a relatively high count of connected components compared to graphics, etc. Higher probabilities can be assigned to tokens for images with higher numbers of components;

Border tokens: a token is issued representing the width of the border along each vertical side of the image. Text in images tends to have relatively large and horizontally consistent right and left borders, unlike other types of images. Higher probabilities can be assigned to tokens for images with larger borders;

Background color tokens: a token is issued indicating the fraction of the pixels of the image which belong to the most common color (assumed to be the background color). As text in images tends to have a consistent background color, higher probabilities can be assigned to tokens for images with higher background color fractions;

Thresholded background tokens: a token is issued for an Otsu-thresholded grayscale histogram, or other suitable thresholding technique, performed on the image. Otsu-thresholding converts a grayscale image into a binary (Black & White) image (a color image would first be converted to a grayscale before thresholding) and is effective at producing a similar result from copies of the same image which have different foreground and background colors. Higher probabilities can be assigned to tokens for images with larger numbers of pixels above the threshold intensity; and Mean grayscale intensity tokens: a token is issued for the average grayscale intensity of the image. Higher probabilities can be assigned to tokens for images with higher intensities as text tends to produce higher intensities than other image contents.

It is contemplated that a variety of other convolution, filtering, statistical and other image-related token schemas, as will occur to those of skill in the art, will also be useful for identifying image-based undesired emails and such other schemas and techniques are within the scope of the present invention.

In addition to the above-mentioned, and other possible, tokens issued for images, the present invention further preferably issues tokens relating to other features of an email containing an image. In particular, but by way of example only, a present embodiment issues tokens for the following image-related features of emails under consideration:

MIME Structure tokens: a token is issued for email summary strings for the MIME structure of the email (i.e.—"+mr+ma+tpth-ig-"—a multipart/related message including a multipart/alternative portion, including text/plain and text/html components, and an image/gif portion). Higher probabilities can be assigned to tokens for html-format emails with embedded images;

HTML Signature tokens: a token is issued for email summary strings for the html structure (i.e.—the type and order of the html elements of the email) of the email. Higher probabilities are assigned to tokens for emails with arrangements resulting in the image being displayed when the email is opened;

Attachment Name tokens: a token is issued for each attachment name. Names which will provide little information, such as "image001.gif", which is a default name in Microsoft Outlook™, may be excluded from tokenization or assigned low probabilities. Higher probabilities are assigned to tokens for emails with recognized names for undesired emails;

Invisible ink tokens: a token is issued for recognized cases where the background and foreground colors in an html-formatted email are not visibly distinguishable ("invisible ink"). Higher probabilities are assigned to tokens for emails which contain such invisible ink as undesired image-based messages often contain random words in invisible ink in attempts to mislead text-based STA processes;

Small fonts tokens: a token is issued for the presence of text in very small fonts. Higher probabilities are assigned to tokens for emails with such small fonts as they are another common technique employed to introduce random words in attempts to mislead text-based STA processes; and Long line tokens: a token is issued if the email has excessively long (unbroken) lines of text. Higher probabilities are assigned to tokens for emails where such long lines are detected, as these are common artifacts of the software used by the spammers to create undesired emails.

Depending upon the training of the STA, the above-mentioned tokens can operate to identify features or characteristics which may indicate either that an email is undesired or desired. It is contemplated that, in most circumstances, tokens which identify features in undesired emails and tokens which identify features in desired emails will both be employed in system 20.

It is contemplated that the use of the combination of tokens issued for image characteristics, tokens issued for email structure and/or tokens issued for features relating to emails containing images and tokens issued for conventional text related elements will result in a relatively robust overall STA process for determining whether emails containing images are desired or undesired.

In particular, it is contemplated that the specific tokens employed with the present invention will change in response to changes made by the spammers who attempt to defeat the present invention, but by performing the STA analysis based upon a robust set of tokens comprising text related tokens, image related tokens and tokens related to features of emails containing images, it will be difficult for spammers to defeat the present invention when delivering a visually acceptable email to most email recipients.

As will now be apparent, the present invention relates to a system and method of detecting undesired email containing image-based messages. The system and method employs a statistical analysis process which identifies and assigns probability values to the presence of each of a pre-selected set of text-related characteristics of an email under consideration and to the presence of each of a pre-selected set of image-related characteristics of the email under consideration. The identified characteristics and their associated probability values are used to determine whether the email is undesired. In one embodiment, the identification and assignment of probability values is a Bayesian analysis and, preferably, a Statistical Token Analysis. The system and method can identify undesired emails which contain images having messages, generally in the form of text in the image.

The above-described embodiments of the invention are intended to be examples of the present invention and alterations and modifications may be effected thereto, by those of skill in the art, without departing from the scope of the invention which is defined solely by the claims appended hereto.

We claim:

1. A computer-implemented method for detecting undesired email containing image-based messages, the method comprising the steps of:

(i) issuing, at an email security device, appropriate tokens and token values for each of a pre-selected set of text-related characteristics of an email under consideration;

(ii) issuing, at said email security device, appropriate tokens and token values for each of a pre-selected set of image-related characteristics of an image in the email under consideration, at least one token associated with an image-related characteristic being dependent upon a result of image processing analysis on data comprising the image;

(iii) performing, at said email security device, a statistical analysis of the tokens associated with text-related and image-related characteristics issued for the email under consideration and determining a probability that the email is undesired; and (iv) employing, at said email security device, the determined probability to decide whether the email is undesired.

2. The method of claim 1 wherein step (ii) further comprises the step of, if the email under consideration includes an image, issuing an appropriate token and token value for each of a pre-selected set of email structure characteristics of the email under consideration.

3. The method of claim 1 wherein the issuance of at least one token in step (ii) is dependent upon the result of processing the image with a convolutional filter.

4. The method of claim 1 wherein the statistical analysis of step (iii) is performed by a first STA process for the tokens issued in step (i) and is performed by a second STA process for the tokens issued in step (ii) and the determined probability employs the an output from both the first STA process and the second STA process.

5. A computer-implemented method for detecting undesired email containing image-based messages, the method comprising the steps of:

(i) determining, at an email security device, the presence of each of a pre-selected set of text-related characteristics of an email under consideration and assigning a probability value to each determined characteristic;

(ii) determining the presence of each of a pre-selected set of image-related characteristics of the email under consideration and assigning a probability value to each determined characteristic, at least one image-related characteristic being dependent upon a result of image processing analysis on data comprising the image;

(iii) performing, at said email security device, a statistical analysis of the email under consideration using the determined text-related and image-related characteristics and their associated probability values to determine a probability that the email is undesired; and (iv) employing, at said email security device, the determined probability to decide whether the email is undesired.

6. The method of claim 5 wherein a Bayesian probability analysis is employed in step (iii).

7. The method of claim 6 wherein the Bayesian probability analysis is a Statistical Token Analysis and the determining of the presence of characteristics and assigning of probability values thereto comprises the issuance of appropriate tokens with corresponding values.

8. The method of claim 5 wherein step (ii) further comprises the step of, if the email under consideration includes an image, determining the presence of each of a pre-selected set of email structure characteristics of the email under consideration and assigning a probability value to each determined characteristic email structure characteristic.

9. The method of claim 5 wherein at least one of the pre-selected set of image-related characteristics is dependent upon the result of processing the image with a convolutional filter.

10. The method of claim 7 wherein the statistical analysis of step (iii) is performed by a first STA process for the tokens issued in step (i) and is performed by a second STA process for the tokens issued in step (ii) and the determined probability employs the an output from both the first STA process and the second STA process.

11. A system for detecting undesired email containing image-based messages, the system comprising:

at least one incoming email server operable to receive emails;

an email security device connected to a network, the email security device being operable to analyze emails received over the network and to forward received emails to said at least one incoming email server; and an undesired email detection process cooperating with the email security device and operable to:

determine the presence of each of a pre-selected set of text-related characteristics of an email under consideration and assigning a probability value to each determined characteristic;

determining the presence of each of a pre-selected set of image-related characteristics of the email under consideration and assigning a probability value to each determined characteristic, at least one image-related characteristic being dependent upon a result of image processing analysis on data comprising the image;

perform a statistical analysis of the email under consideration using the determined text-related and image-related characteristics and their associated probability values to determine a probability that the email is undesired; and wherein the email security device employs the determined probability to decide whether the email is undesired.

12. The system of claim 11 where, when the email security device has decided an email is undesired, it forwards the undesired email to the incoming email server with an indication that the email is undesired.

13. The system of claim 11 wherein the statistical analysis is a Bayesian analysis.

14. The system of claim 13 wherein the Bayesian probability analysis is a Statistical Token Analysis (STA) and the determining of the presence of characteristics and assigning of probability values thereto comprises the issuance of appropriate tokens with corresponding values.

15. The system of claim 14 wherein a first STA process is performed for the pre-selected set of text-related characteristics and a second STA process is performed for the pre-selected set of image-related characteristics and wherein the email security device employs the determined probabilities from each of the first STA process and the second STA process to decide whether the email is undesired.

* * * * *